(12) United States Patent
Grossetete et al.

(10) Patent No.: US 8,389,636 B2
(45) Date of Patent: Mar. 5, 2013

(54) POLYSTYRENE BLENDS

(75) Inventors: Camille Grossetete, Ivry sur Seine (FR); David W. Knoeppel, League City, TX (US); Jose M. Sosa, Deer Park, TX (US); Shane Steagall, Houston, TX (US); Carlos Corletto, Seabrook, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 13/530,212

(22) Filed: Jun. 22, 2012

(65) Prior Publication Data

US 2012/0259071 A1     Oct. 11, 2012

Related U.S. Application Data

(62) Division of application No. 13/074,763, filed on Mar. 29, 2011, now Pat. No. 8,242,212.

(60) Provisional application No. 61/319,427, filed on Mar. 31, 2010.

(51) Int. Cl.
*C08L 25/02*     (2006.01)

(52) U.S. Cl. .................. 525/241; 524/577; 524/578

(58) Field of Classification Search .................. 525/241; 524/577, 578
See application file for complete search history.

(56) References Cited

U.S. PATENT DOCUMENTS

| | | | | |
|---|---|---|---|---|
| 5,001,192 A | * | 3/1991 | Sun | ................................ 525/76 |
| 7,906,589 B2 | * | 3/2011 | Krupinski | ..................... 525/192 |

* cited by examiner

*Primary Examiner* — Nathan M Nutter

(57) ABSTRACT

A method of preparing a polystyrene blend that includes combining a first polystyrene composition having a first melt flow index with a second polystyrene composition having a second melt flow index and forming a polystyrene blend, the second melt flow index being at least 2 dg/min higher that the first melt flow index. The polystyrene blend has an observed tensile strength value greater than 3% above the expected tensile strength value. The second polystyrene composition can include a recycled polystyrene material, which can include expanded polystyrene. An alternate method of preparing the polystyrene blend includes combining a polystyrene composition with a styrene monomer to form a reaction mixture, polymerizing the reaction mixture and obtaining a polystyrene blend, where the polystyrene containing composition has a melt flow index at least 2 dg/min higher than the melt flow index of the styrene monomer after it has been polymerized.

6 Claims, 10 Drawing Sheets

POLYSTYRENE BLENDS

CROSS-REFERENCE TO RELATED APPLICATIONS

This application is a divisional of U.S. patent application Ser. No. 13/074,763 filed Mar. 29, 2011, and now U.S. Pat. No. 8,242,212, which claims priority to provisional patent application No. 61/319,427 filed on Mar. 31, 2010.

The present invention is generally related to polystyrene. More specifically, the present invention is related to improved methods of making polystyrene blends.

BACKGROUND

Styrene, also known as vinyl benzene, is an aromatic compound that is produced in industrial quantities from ethyl benzene. The most common method of styrene production comprises the dehydrogenation of ethylbenzene, which produces a crude product of styrene and ethylbenzene. Polystyrene is an aromatic polymer produced from the styrene monomer. Polystyrene is a widely used polymer found in insulation, packaging, disposable cutlery, and foam cups.

Expanded polystyrene (EPS) is well known and can be produced by combining an expandable gas, such as $CO_2$, with polystyrene, such as during the production of foamed products and can include extruded polystyrene (XPS). EPS can be used in applications such as insulation material as the entrapped gaseous content resists the flow of heat thereby giving insulating properties. EPS can be used in applications in packaging providing protection from impact due to the entrapped gaseous content. Other types of polystyrene include elastomer-reinforced polymers of monovinylidene aromatic compounds such as styrene, a-methylstyrene, and ring-substituted styrene that can be useful for a range of applications including food packaging, office supplies, point-of-purchase signs and displays, housewares and consumer goods, building insulation, and cosmetics packaging. Such elastomer-reinforced polymers are commonly referred to as impact modified or high impact polystyrene (HIPS) while a styrene homopolymer may be referred to as general-purpose polystyrene (GPPS).

Byproducts and excess amounts of polystyrene and polystyrene containing compositions are produced during the process of molding, shaping and producing the products containing polystyrene. These byproducts, along with post commercial, post consumer polystyrene products, often become waste that can end up in landfills or incinerators. It is desirable to recycle this material in order to prevent waste and pollution. It is also desirable to obtain polystyrene having improved tensile properties in order that a lesser amount of polystyrene may be needed in a given polystyrene product, which can result in an overall reduction in polystyrene waste.

SUMMARY

An embodiment of the present invention, either by itself or in combination with other embodiments, is a method of preparing a polystyrene blend that includes combining a first polystyrene composition having a first melt flow index with a second polystyrene composition having a second melt flow index and forming a polystyrene blend, the second melt flow index being at least 2 dg/min higher that the first melt flow index. The first polystyrene containing composition has a first tensile strength value and the second polystyrene containing composition has a second tensile strength value and the polystyrene blend has an expected tensile strength value. The expected tensile strength value is a weighted average of the first tensile strength value and the second tensile strength value based on the amount of the first polystyrene containing composition and the second polystyrene containing composition in the polystyrene blend. The polystyrene blend has an observed tensile strength value greater than 3% above the expected tensile strength value.

In an embodiment of the present invention, either by itself or in combination with other embodiments, the polystyrene blend can have a second polystyrene composition:first polystyrene composition weight ratio of from 1:99 to 1:1.

In an embodiment of the present invention, either by itself or in combination with other embodiments, the second polystyrene composition can include a recycled polystyrene material, which can include expanded polystyrene.

In an embodiment of the present invention, either by itself or in combination with other embodiments, the combining of the first polystyrene composition with the second polystyrene composition can occur in an apparatus selected from the group of a mixer, a compounder, and an extruder.

An embodiment of the present invention, either by itself or in combination with other embodiments, can include articles made from the polystyrene blend.

An embodiment of the present invention, either by itself or in combination with other embodiments, is a method of preparing a polystyrene blend that includes combining a polystyrene composition with a styrene monomer to form a reaction mixture, polymerizing the reaction mixture in a polymerization reactor, and obtaining a polystyrene blend, where the polystyrene containing composition has a melt flow index at least 2 dg/min higher than the melt flow index of the styrene monomer after it has been polymerized.

In an embodiment of the present invention, either by itself or in combination with other embodiments, the polystyrene composition can be added to the styrene monomer in amounts ranging from 0.1 to 50 wt. % based on the total weight of the mixture and can include recycled polystyrene material, which can include expanded polystyrene.

An embodiment of the present invention, either by itself or in combination with other embodiments, can include articles made from the polystyrene made by the method disclosed herein.

An embodiment of the present invention, either by itself or in combination with other embodiments, is a polystyrene blend of a first polystyrene having a first melt flow index and a second polystyrene having a second melt flow index where the second melt flow index is at least 2 dg/min higher that the first melt flow index. The second polystyrene is 0.1 to 40 wt. % of the total weight of the polystyrene blend and the first polystyrene has a first physical property value and the second polystyrene has a second physical property value and the polystyrene blend has an expected physical property value when combined. The expected physical property value is a weighted average of the first physical property value and the second physical property value based on the amount of the first polystyrene and the second polystyrene in the polystyrene blend and the polystyrene blend has an observed physical property value greater than 3% above the expected physical property value.

An embodiment of the present invention, either by itself or in combination with other embodiments, can include articles made from the polystyrene blend.

Other possible embodiments include two or more of the above embodiments of the invention. In an embodiment the method includes all of the above embodiments and the various procedures can be carried out in any order.

DETAILED DESCRIPTION

Figure 1:
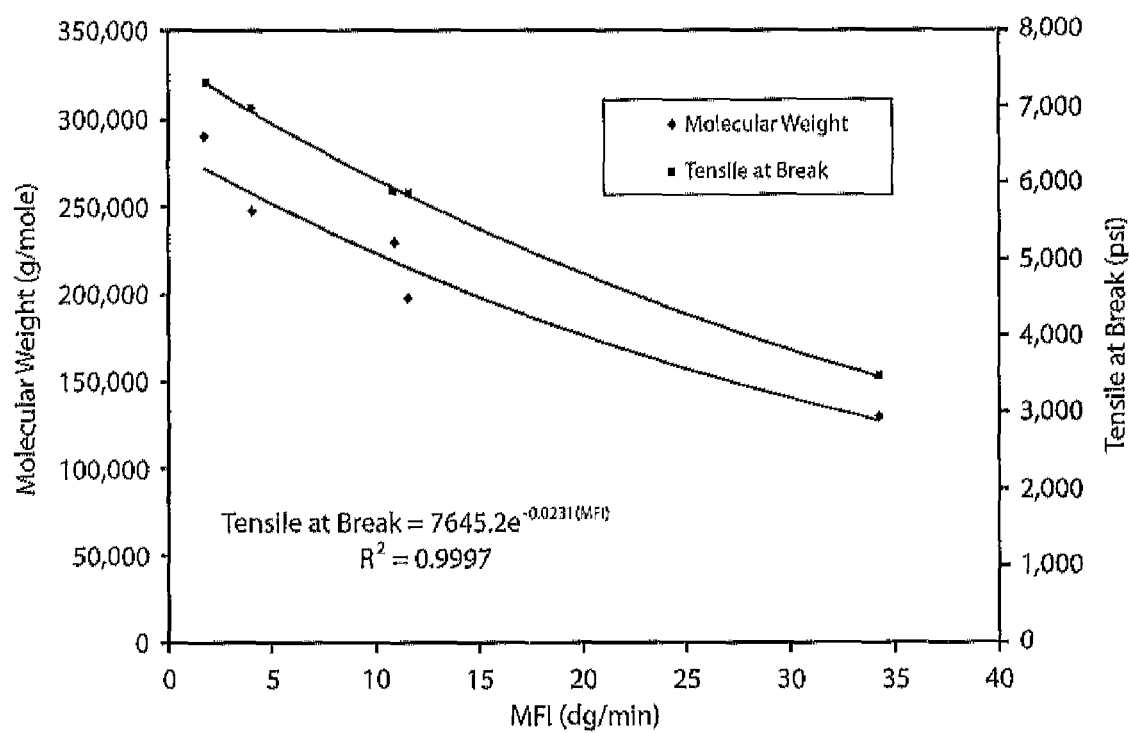
FIG. 1 illustrates a graph of tensile strength and molecular weight as a function of melt flow index.

The molecular weight and polymer melt viscosity of a thermoplastic compound typically trend as the inverse of the melt flow index (MFI). As a general rule, most physical properties, such as tensile strength and flexural strength, of a thermoplastic are a function of the molecular weight and thus the properties can also be related to the MFI (see FIG. 1). According to the present invention, the blending of a high melt flow polystyrene with a low melt flow polystyrene can give increased tensile properties within a given melt flow range falling between that of the high and low melt flow products.

It has been found that the tensile properties of polystyrene can be improved by blending an amount of high melt flow index polystyrene with low melt flow index polystyrene. More specifically, it has been found that a certain amount of high melt flow index polystyrene blended with a low melt flow index polystyrene can yield a polystyrene blend having unexpected improvements in tensile properties.

According to an embodiment of the present invention, a polystyrene blend is obtained by combining a polystyrene composition having a high melt flow index with a polystyrene composition having a low melt flow index. In an embodiment, a polystyrene blend is obtained by combining a first polystyrene composition with a second polystyrene composition where the difference in the melt flow index of the two is greater than 2 dg/min. In an embodiment, a polystyrene blend is obtained by combining a polystyrene composition having a melt flow index of greater than 7 dg/min with a polystyrene composition having a melt flow index of less than 5 dg/min. In another embodiment, a polystyrene blend is obtained by combining a polystyrene composition having a melt flow index of greater than 9 dg/min with a polystyrene composition having a melt flow index of less than 5 dg/min. In a further embodiment, a polystyrene blend is obtained by combining a polystyrene composition having a melt flow index of greater than 10 dg/min with a polystyrene composition having a melt flow index of less than 5 dg/min.

In an embodiment, the high melt flow polystyrene is added to the polystyrene blend in amounts of less than 60 wt. % based on the weight of the polystyrene blend. In another embodiment, the high melt flow polystyrene is added to the polystyrene blend in amounts ranging from 0.1 to 50 wt. % based on the weight of the polystyrene blend. In a further embodiment, the high melt flow polystyrene is added to the polystyrene blend in amounts ranging from 1 to 40 wt. % based on the weight of the polystyrene blend.

In an embodiment, the polystyrene blend contains high melt flow polystyrene:low melt flow polystyrene weight ratios of from 1:99 to 1:1. In another embodiment, the polystyrene blend contains high melt flow polystyrene:low melt flow polystyrene weight ratios of from 1:50 to 2:3. In a further embodiment, the polystyrene blend contains high melt flow polystyrene:low melt flow polystyrene weight ratios of from 1:10 to 1:2.

In an embodiment, the difference in melt flow index between the high melt flow index polystyrene and the low melt flow index polystyrene is at least 2 dg/min. In an embodiment, the high melt flow index polystyrene is present in the polystyrene blend in amounts ranging from 0.1 wt. % to 40 wt. % of the total weight of the combined polystyrene blend. If the difference between the high melt flow index and the low melt flow index is at least greater than 2 dg/min and the high melt flow index polystyrene is present in amounts ranging from 0.1 wt. % to 40 wt. % of the total weight of the combined polystyrene blend, then certain physical properties will be unexpectedly improved. For example, tensile strength and percent elongation will show an unexpected improvement.

In an embodiment, a polystyrene blend is achieved by combining a polystyrene containing high melt flow GPPS. In an embodiment, a polystyrene blend is achieved by combining a polystyrene containing compound with a recycled material. In another embodiment, a polystyrene blend is obtained by combining a polystyrene containing compound with a recycled material containing polystyrene. In a further embodiment, the recycled material includes expanded polystyrene. In a further embodiment, the recycled material includes post industrial PS. In a further embodiment, the recycled material includes post commercial PS. In a further embodiment, the recycled material includes post consumer PS. In a further embodiment, the recycled material includes post construction PS.

In an embodiment, the polystyrene blend is obtained by combining a styrene monomer with a recycled material. In another embodiment, a polystyrene blend is obtained by combining a styrene monomer with a recycled material containing polystyrene. In a further embodiment, the recycled material includes expanded polystyrene.

Expanded polystyrene (EPS) can be used in molded sheets for building insulation and packing material for cushioning fragile items inside boxes. EPS recycle includes EPS scraps and byproducts left over from the making of products containing EPS and after their use. These recycle materials can be classified as post industrial, post commercial, post consumer, and post construction. Post industrial EPS primarily includes scrap from EPS molders and fabricators. Post industrial EPS is usually the cleanest, or less contaminated, type of recycled EPS. Post commercial EPS primarily includes packaging materials from furniture and appliances. Post commercial EPS usually has a greater contamination than post industrial EPS. Post commercial recycled EPS will still contain some contaminants (e.g. wood, glue, paper, etc.); however, it should be cleaner than post consumer EPS and post construction EPS. Post consumer EPS includes a wider range of products including food packaging (e.g. coffee cups, clam shells, etc.). Post construction EPS includes foam materials generated from building renovations and demolition.

In an embodiment, the high melt flow index polystyrene composition is a recycled material. In another embodiment, the high melt flow index polystyrene composition is a recycled EPS. In a further embodiment, the recycled EPS is post industrial and/or post commercial EPS. Recycled material can contain contamination. For instance, recycled EPS can contain contamination due to other components in the recycle, such as tape, cellulose (paper), and other plastics. If present in a polystyrene blend, these contaminants usually negatively impact the physical properties of the blend. By using a recycled high melt flow index polystyrene, having contaminants, with a low melt flow index polystyrene, in which the difference between the high melt flow index and the low melt flow index is at least greater than 2 and the high melt flow index polystyrene is present in amounts ranging from 0.1 wt. % to 40 wt. % of the total weight of the combined polystyrene blend, then certain physical properties will be unexpectedly improved. This contaminated blend having improved physical properties can compensate to some degree for the negative effects of contamination, allowing for a greater use of recycled materials in polystyrene blends. In an embodiment the blend having improved physical properties can compensate for at least 20% of the negative effects of contamination, optionally at least 10%, optionally at least 5%. In an embodiment the blend having improved physical properties can compensate for a majority of the negative effects of contamination. In an embodiment the blend having improved physical properties can compensate for all of the negative effects of contamination.

In an embodiment, the high melt flow index polystyrene composition can be incorporated into a polystyrene blend according to any method known in the art. In an embodiment, a polystyrene blend is obtained by mixing a high melt flow index polystyrene composition with a low melt flow index polystyrene composition. In an embodiment, the high melt flow index polystyrene composition is combined with the low melt flow index polystyrene composition in a compounder and melt blended. In another embodiment, the high melt flow index polystyrene composition is combined with the low melt flow index polystyrene composition by melt blending in a mixer. In an alternative embodiment, the high melt flow index polystyrene composition is combined with the low melt flow index polystyrene composition by melt blending in an extrusion step. In various examples a high melt flow index polystyrene was combined with a low melt flow index polystyrene separately in a mixer, a compounder, and an extruder. In each case, similar improvements in physical properties were obtained under differing types of blending.

In an embodiment, the polystyrene blend has an observed tensile strength value greater than 3% above the expected tensile strength value. In an embodiment, the polystyrene blend has an observed tensile strength value greater than 5% above the expected tensile strength value. In an embodiment, the polystyrene blend has an observed tensile strength value greater than 7% above the expected tensile strength value. In an embodiment, the polystyrene blend has an observed tensile strength value greater than 10% above the expected tensile strength value. In an embodiment, the polystyrene blend has an observed tensile strength value greater than 15% above the expected tensile strength value.

In an embodiment, a high melt flow index polystyrene composition is combined with styrene monomer prior to polymerization of the styrene monomer to produce a polymer blend product. According to an embodiment of the present invention, a polystyrene blend is obtained by combining a polystyrene composition having a high melt flow index at least 2 dg/min higher than the melt flow index of the styrene monomer after it has been polymerized and polymerizing the mixture. In an embodiment, the melt flow index of the polystyrene composition is at least 4 dg/min higher than the melt flow index of the styrene monomer after it has been polymerized.

In an embodiment, a polystyrene blend is obtained by combining a polystyrene composition having a melt flow index of greater than 7 dg/min with a styrene monomer having a melt flow index after polymerization of less than 5 dg/min. In an embodiment, a polystyrene blend is obtained by combining a polystyrene composition having a melt flow index of greater than 9 dg/min with a styrene monomer having a melt flow index after polymerization of less than 5 dg/min. In an embodiment, a polystyrene blend is obtained by combining a polystyrene composition having a melt flow index of greater than 10 dg/min with a styrene monomer having a melt flow index after polymerization of less than 5 dg/min.

In an embodiment, the high melt flow polystyrene is added to the polystyrene monomer in amounts of less than 60 wt. % based on the weight of the final polymerized polystyrene blend. In another embodiment, the high melt flow polystyrene is added to the polystyrene monomer in amounts ranging from 0.1 to 50 wt. % based on the weight of the final polymerized polystyrene blend. In a further embodiment, the high melt flow polystyrene is added to the polystyrene monomer in amounts ranging from 1 to 40 wt. % based on the weight of the final polymerized polystyrene blend.

In Example 5 (below), a high melt flow index polystyrene composition is combined with styrene monomer in a polymerization reactor to produce a polymer blend product. In this example, an improvement in physical property was observed over polystyrene product in which the high melt flow index polystyrene composition was not combined with the styrene monomer.

EXAMPLES

The feasibility of incorporating EPS recycled materials into high heat crystal polystyrene (HHC PS) was investigated. Melt and reactor blends were investigated to incorporate EPS with both methods demonstrating similar technical feasibility and challenges. Unexpectedly, the mechanical properties of the blends seem to be relatively unchanged or even improved with up to 40-weight percent incorporation. It is expected that blends of high and low melt flow polystyrenes give decreased physical properties relative to the properties of the low melt flow virgin polystyrene.

Seven samples of EPS from different sources were tested. These samples serve as a comparison of the materials that might be received in a recycle facility. As shown in Table 1, the EPS will have a range of physical properties. While not reflected in these analyses, often times these samples contained adhesive and paper products (e.g. from labels) that were not always visible, but encapsulated within the densified block. This also raises the concern of product consistency within the densified blocks. Some samples are a recycled pellet of EPS material. Sample E is PS that has been treated to be fire resistant.

TABLE 1

Analyses of EPS Recycle.

| | Sample ID | | | | | | |
|---|---|---|---|---|---|---|---|
| | A | B | C | D | E | F | G |
| Form | Foam Board | Densified | Densified | Pellets | Pellets | Densified | Densified |
| Color | Pink | White | White | Amber | Brown | White | White |
| MFI (dg/min) | 13.0 | 10.8 | 7.2 | 3.7 | 37.0 | NA | NA |
| Mn (g/mol) | 81,758 | 93,347 | 87,925 | 95,014 | 46,008 | 88,590 | 93,593 |
| Mw (g/mol) | 215,368 | 249,489 | 233,834 | 255,747 | 115,468 | 317,499 | 280,775 |
| Mz (g/mol) | 384,281 | 468,934 | 422,811 | 483,468 | 212,302 | 745,552 | 596,481 |
| D (Mw/Mn) | 2.6 | 2.7 | 2.7 | 2.7 | 2.5 | 3.6 | 3.0 |
| Mp (g/mol) | 193,276 | 189,475 | 190,127 | 188,270 | 107,563 | 189,209 | 198,169 |
| Wt. % Mineral Oil | 0 | 0 | 0.13 | 0 | 0.94 | 0 | 0 |

Physical blending of the EPS recycle samples with HHC PS was done through melt blending using a DSM compounder, a Haake mixer, and a Brabender extruder. The HHC PS used in these studies are provided in Table 2, two of the PS grades, 535 & 523 W are commercially available from Total Petrochemicals Inc., while the third PS will be referred to as GPPS and has the properties as found in Table 2. Optimized conditions were sought to mitigate negative effects of the EPS on MFI, MW, and color. Those parameters are reported below. The EPS was first ground to a fine powder before mixing with virgin crystal PS pellets. Blend levels up to 40 weight percent were targeted in the final product. Because of the low bulk density and very fine nature of the ground EPS, slight variations in the targeted blend concentrations were expected. This was due to the challenges of delivering this material blended with pellets to the mixing equipment. Finally, to complete polymer property testing a minimum of 150 grams of the blends were needed.

TABLE 2

HHC PS Grades Employed in These Studies.

| | HHC PS Grade | | |
|---|---|---|---|
| | 535 | GPPS | 523W |
| Target MFI (dg/min) | 4.0 +/− 0.5 | 5.0 +/− 0.7 | 11.0 +/− 2.0 |
| Mn (g/mol) | 93,700 | 79,800 | 64,500 |
| Mw (g/mol) | 255,000 | 235,300 | 196,400 |
| Mz (g/mol) | 247,100 | 229,400 | 204,800 |
| D (Mw/Mn) | 2.7 | 2.9 | 3.0 |
| Zinc Stearate Concentration (ppm) | 1,000 | 0 | 0 |

Example 1

Figure 2:
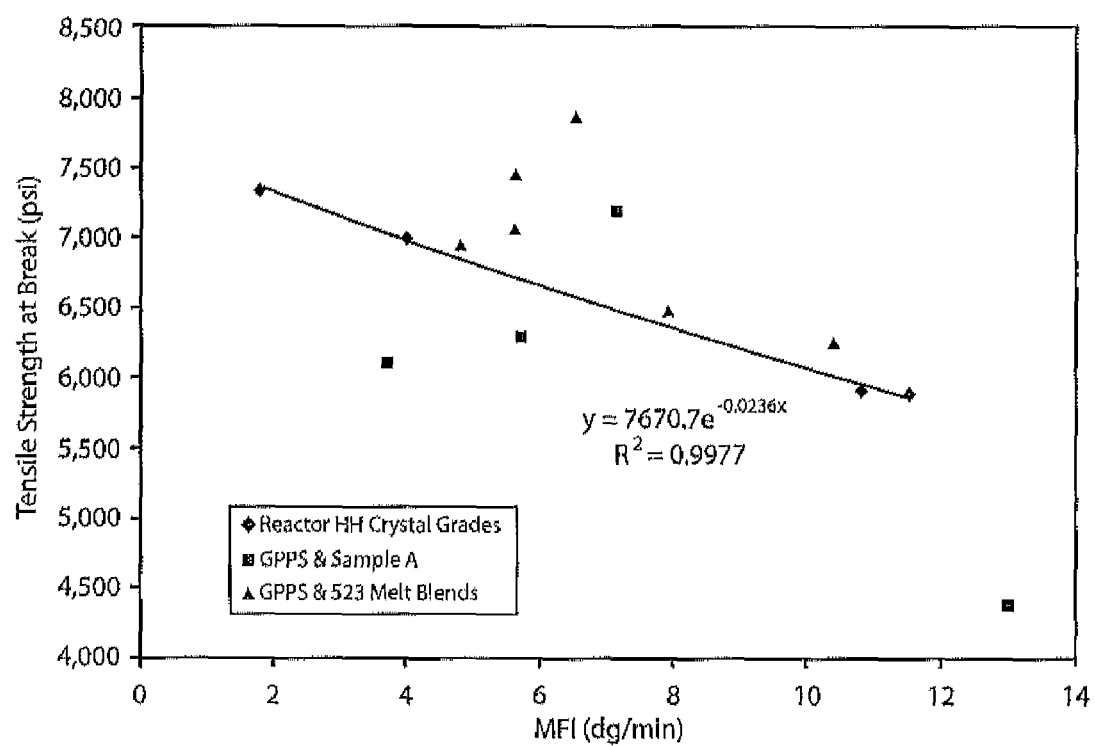
FIG. 2 is a graph of tensile strength at break versus the melt flow index of DSM compounded blends.

The conditions employed in a DSM compounder are given in Table 3. For this set of experiments GPPS was blended with the Sample A EPS. Due to the small volume of the DSM compounder, multiple eight-gram samples were prepared in order to complete the polymer testing. The polymer properties are provided in Table 4. Expectedly, the melt flows increased with EPS incorporation due to its higher MFI relative to GPPS. However, even with the addition of Irganox 1076® (octadecyl-3,5-di-tert-butyl-4-hydroxyhydrocinnamate) to stabilize the polymer melt, the data suggest there was considerable degradation of the blend as the measured values were somewhat higher than the predicted numbers for the 10 and 20 weight percent blends. In part this was due to the presence of brominated flame retardant, and it is likely that the DSM extruder conditions lead to considerable degradation as well. The addition of the lower MW EPS was unexpectedly found to provide higher tensile strength relative to the HHC. The lower strength EPS, should have resulted in a drop in strength in the blends. This same trend was seen in mixtures of GPPS and 523 (FIG. 2).

TABLE 3

DSM Compounder Conditions.

| Barrel Temperature (° C.) | 200 |
|---|---|
| Mixer Speed (rpm) | 30 |
| Residence Time (minutes) | 3 |
| Irganox 1076 ® Conc. (ppm) | 1,000 |
| Purge Gas | Nitrogen |

TABLE 4

DSM Compounder Blended GPPS and Sample A EPS Polymer Properties.

| Wt. % EPS | Predicted MFI (dg/min) | MFI (dg/min) | Tensile Modulus (psi) | Strength at Break (psi) | Tensile at Max (psi) | % Elongation at Break |
|---|---|---|---|---|---|---|
| 0 | 3.70 | 3.7 | 466,090 | 6,106 | 6,153 | 1.3 |
| 10 | 4.20 | 5.7 | 469,663 | 6,294 | 6,358 | 1.4 |
| 20 | 4.76 | 7.1 | 471,251 | 7,184 | 7,248 | 1.6 |
| 100 | 13.00 | 13 | 419,503 | 4,371 | 4,397 | 0.8 |

At 10 wt % EPS the predicted strength at break is 5,684 psi. The observed strength at break of 6,294 psi is an increase of 10.7% over prediction. At 20 wt % the predicted strength at break is 5,405 psi. The observed strength at break of 7,184 psi is an increase of 32% over prediction.

Example 2

A Haake mixer was also employed to melt blend virgin HHC PS with EPS. Fifty-gram samples were made and the conditions used are provided in Table 5. Once blended, the polymers were pressed into tensile bars. For these experiments, EPS Sample B and EPS Sample C were blended with low and high MFI HHC PS GPPS and 523 W, respectively.

TABLE 5

Haake Mixer Conditions.

| | |
|---|---|
| Mixer Temperature (° C.) | 200 |
| Mixer Speed (rpm) | 30 |
| Residence Time (minutes) | 3 |
| Irganox 1076 ® Conc. (ppm) | 1,000 |
| Purge Gas | Nitrogen |

Figure 3:
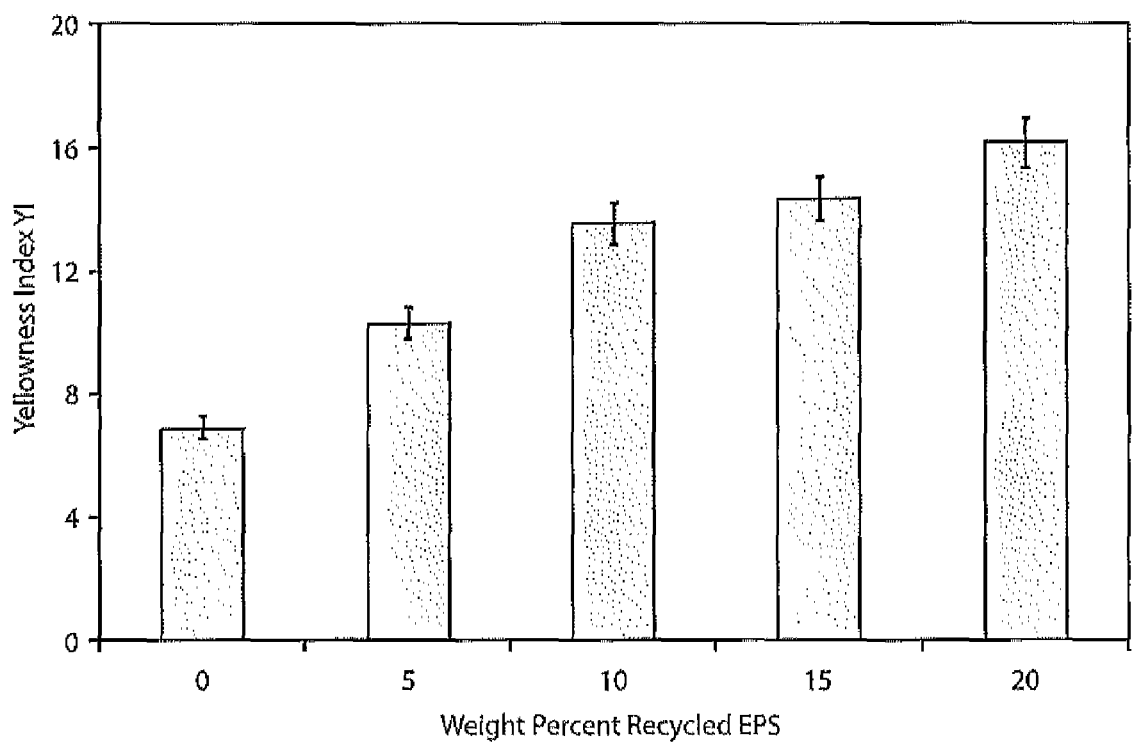
FIG. 3 is a bar graph of Yellowness Index YI versus weight percent EPS.
Figure 4:
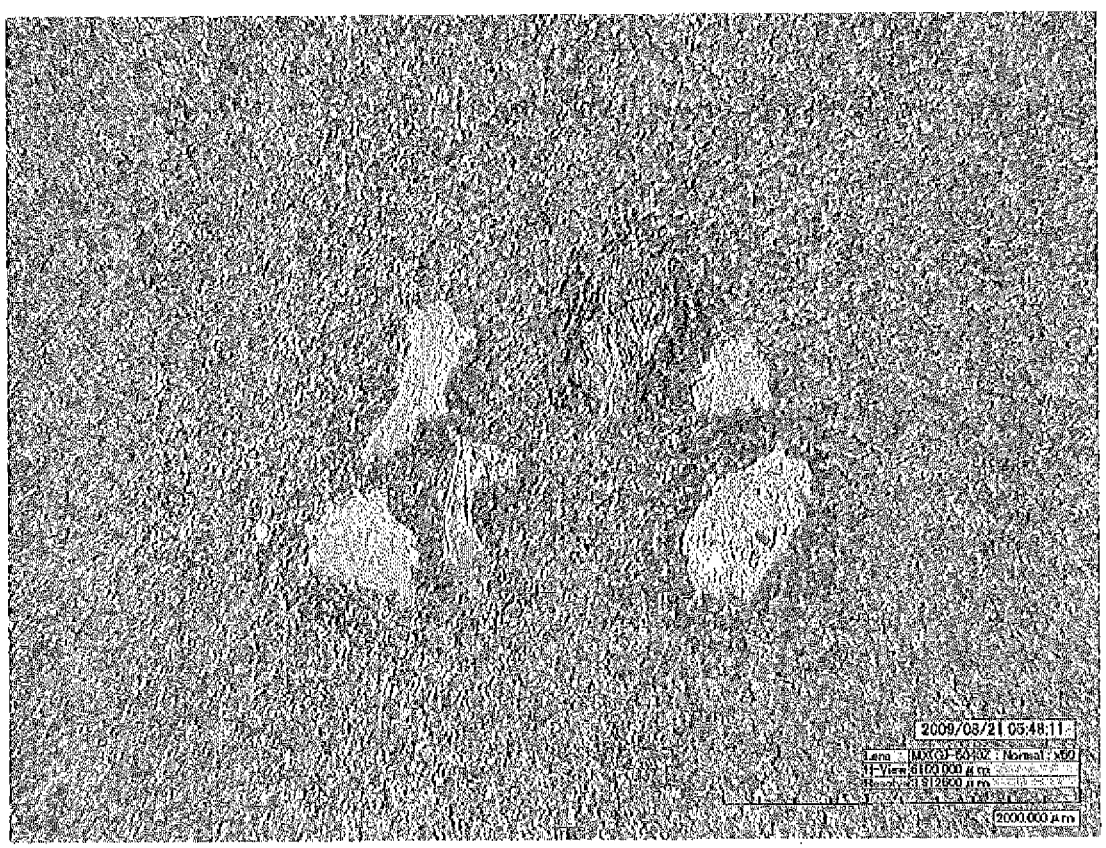
FIG. 4 is a microscopic picture of particles isolated from Sample B.
Figure 5:
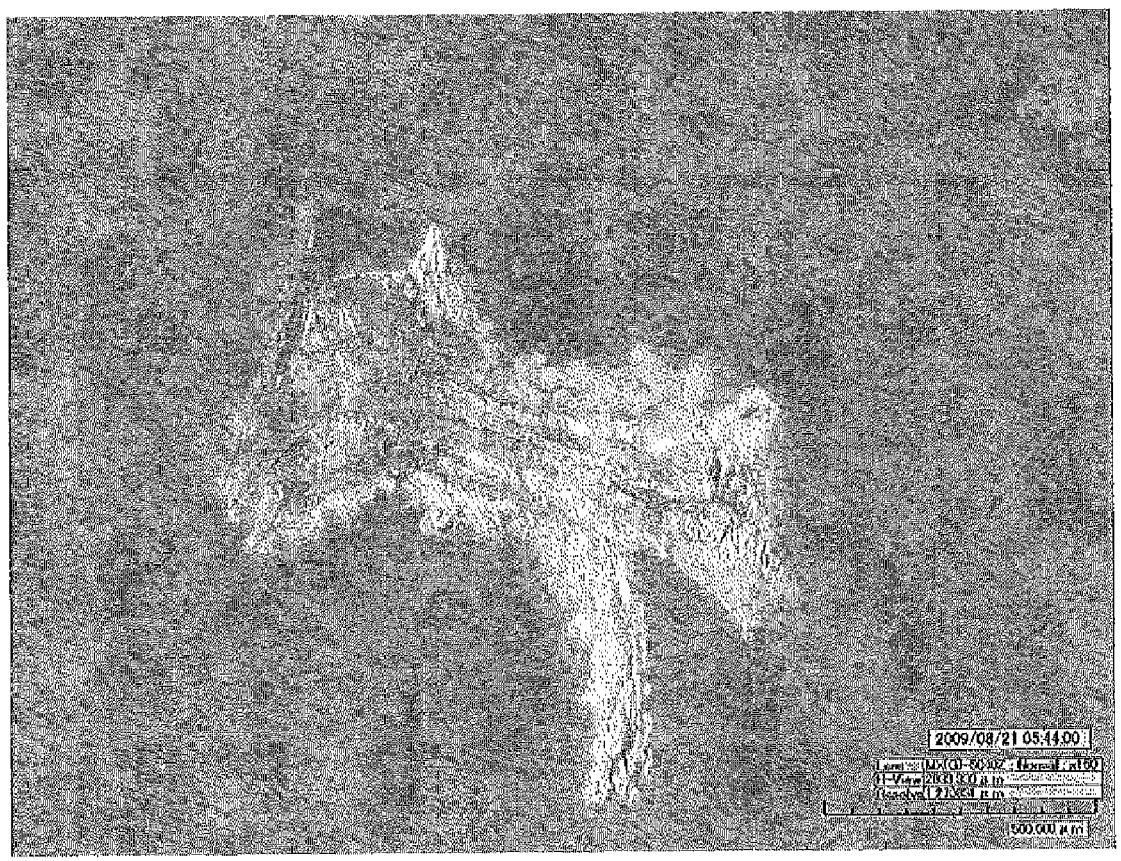
FIG. 5 is another microscopic picture of particles isolated from Sample B.

The yellowness index for the GPPS/Sample B blend is provided in FIG. 3. These numbers are not surprising as the tensile bars had a yellow-brown appearance with yellow and black contaminants. A few yellow and brown particles isolated from the EPS were identified by infrared spectroscopy to be either polyurethane or a derivative of cellulose (FIGS. 4 and 5). Both materials can be found in tape, stickers and paper. Attempts to mitigate the color issues with 1,000 ppm Irgafos® 168 (Ciba-Tris (2,4-di-tert-butylphenyl)phosphate) instead of Irganox® 1076 were not successful likely due to the fact that the color was caused primarily from the contaminants already present in the EPS. The addition of ZnO only served to whiten the polymer.

Table 6 provides the physical properties of the HHC PS and EPS blends. Like the DSM compounded samples, the melt flows trend with the blend ratios of the two different melt flow polystyrenes. Additionally, the predicted and measured melt flows are comparable, which suggests the Haake mixer conditions were more amenable to minimize degradation. Similarly to the DSM results, the percent elongation and tensile strength rose somewhat for the low melt flow HHC PS with blends up to roughly 20 weight percent EPS. On the other hand, the tensile properties remain essentially unchanged throughout the blend concentrations containing high flow 523 and EPS Sample B.

TABLE 6

Polymer Properties of Haake Mixed Polymer Blends.

| Blend | Wt. % EPS | Predicted MFI (dg/min) | MFI (dg/min) | Tensile Modulus (psi) | Strength at Break (psi) | Tensile at Max (psi) | % Elongation at Break |
|---|---|---|---|---|---|---|---|
| GPPS/Sample B | 0 | 4.5 | 4.5 | 462,643 | 6,942 | 7,021 | 1.78 |
| | 5 | 4.8 | 4.4 | 454,164 | 7,505 | 7,550 | 2.20 |
| | 10 | 5.0 | 5.3 | 450,817 | 7,369 | 7,417 | 2.11 |
| | 20 | 5.6 | 5.9 | 451,346 | 7,461 | 7,500 | 2.14 |
| | 40 | 6.9 | 6.4 | 448,607 | 6,813 | 6,834 | 1.74 |
| | 100 | 13.0 | 13.0 | 454,032 | 6,323 | 6,358 | 1.52 |
| GPPS/Sample C | 0 | 4.8 | 4.8 | 462,643 | 6,942 | 7,021 | 1.78 |
| | 5 | 5.0 | 4.8 | 445,470 | 7,091 | 7,165 | 1.93 |
| | 10 | 5.1 | 5.1 | 448,480 | 7,283 | 7,338 | 2.04 |
| | 20 | 5.5 | 5.8 | 453,298 | 6,862 | 6,874 | 1.76 |
| | 40 | 6.3 | 6.5 | 446,715 | 6,155 | 6,206 | 1.52 |
| | 100 | 9.5 | 9.5 | 441,039 | 5,744 | 5,827 | 1.45 |
| 523/Sample B | 0 | 10.7 | 10.7 | 459065 | 6252 | 6302 | 1.47 |
| | 20 | 10.4 | 11.0 | 446314 | 6016 | 6107 | 1.46 |
| | 40 | 10.2 | 10.2 | 446454 | 6199 | 6245 | 1.51 |
| | 100 | 9.4 | 9.4 | 441039 | 5744 | 5827 | 1.45 |

TABLE 7

Polymer Properties of GPPS/EPS Sample B Polymer Blends.

| wt % EPS | Strength (psi) | Predicted Strength (psi) | Measured Strength (psi) | Difference in Strength (%) |
|---|---|---|---|---|
| 0 | 6942 | | 6942 | — |
| 5 | | 6911 | 7505 | 8.6 |
| 10 | | 6880 | 7369 | 7.1 |
| 20 | | 6818 | 7461 | 9.4 |
| 40 | | 6694 | 6813 | 1.8 |
| 100 | 6323 | | 6323 | — |

Figure 9:
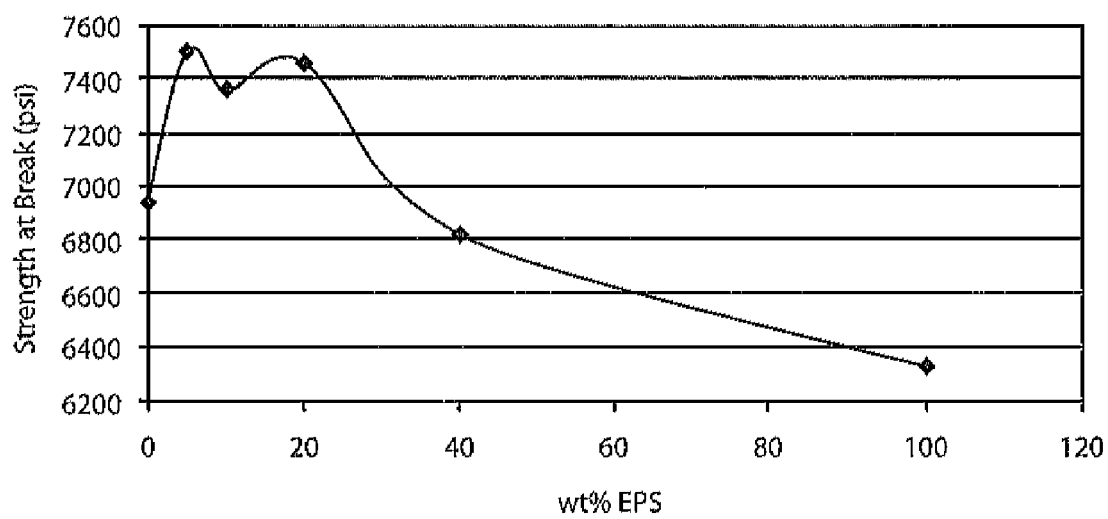
FIG. 9 is a graph of strength at break values versus the wt % EPS in a PS mixture in accordance with the present invention.
Figure 10:
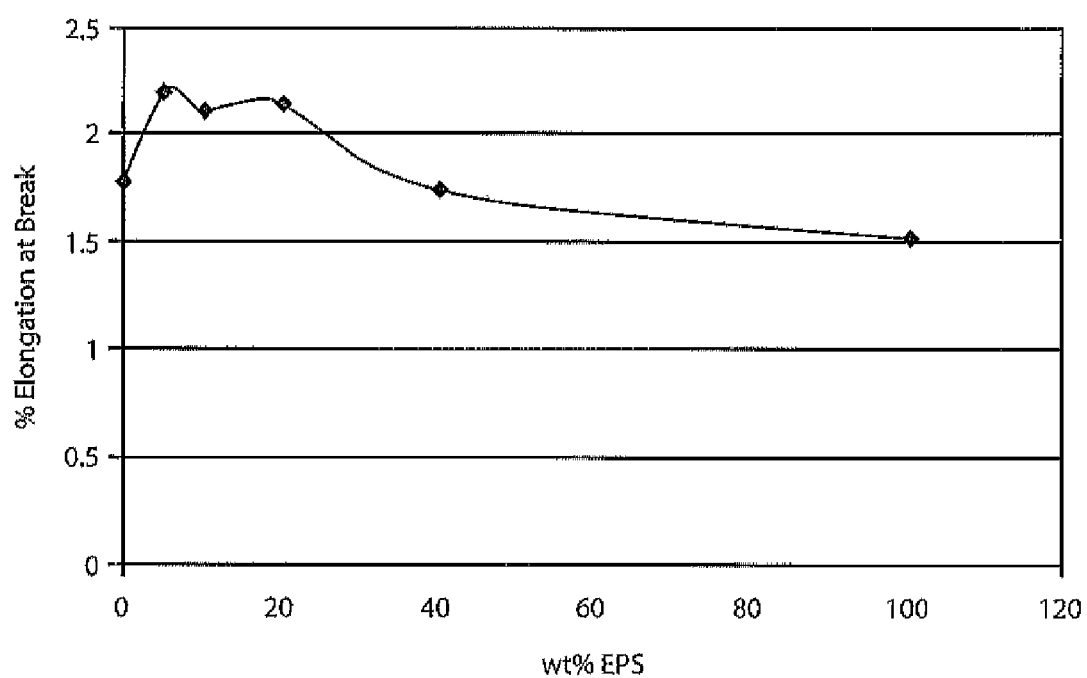
FIG. 10 is a graph of % elongation at break values versus the wt % EPS in a mixture in accordance with the present invention.

For a blend of GPPS/Sample B the strength at break was predicted to be the weighted average based on the wt % of the blend. For a blend of GPPS/Sample B the strength at break was measured to be above the projected strength based on the wt % of the blend. The blend components have a MFI (dg/min) of 4.5 for the Sample B and 13.0 for the GPPS polystyrene. The difference of the MFI values of the components was 8.5. Between the blend range of 0.1 wt % and 40 wt % EPS the strength was found to be increased at points within this range above what was expected. This is illustrated in FIG. 9 where the strength at break values are plotted versus the percent EPS in the mixture. The % elongation at break values versus percent EPS in the mixture is shown in FIG. 10. At the measured data points the difference in strength (strength at break in psi), in percent above the expected value, ranges from 1.8 to 9.4, as shown in Table 7. If a correlation between the difference of the MFI values of the two components and the difference in strength in percent above the expected value is made, it can be seen that the increase in strength in percent above the expected value can range between 0.2 and 1.1 times the difference of the MFI values.

In embodiments of the present invention an increase in strength in percent above the expected value can be greater than 0.2 times the difference of the MFI values. In an embodiment the increase in strength in percent above the expected value can range from between 0.2 and 5.0 times the difference of the MFI values, optionally from between 0.2 and 4.0 times the difference of the MFI values, optionally from between 0.2 and 3.0 times the difference of the MFI values, optionally from between 0.2 and 2.0 times the difference of the MFI values. In embodiments of the present invention an increase in strength in percent above the expected value can be greater than 3%, optionally greater than 5%, optionally greater than 7%.

In embodiments of the present invention an increase in elongation at break in percent above the expected value can be greater than 0.2 times the difference of the MFI values. In an embodiment the increase in elongation at break in percent above the expected value can range from between 0.2 and 5.0 times the difference of the MFI values, optionally from between 0.2 and 4.0 times the difference of the MFI values, optionally from between 0.2 and 3.0 times the difference of the MFI values, optionally from between 0.2 and 2.0 times the difference of the MFI values.

In embodiments of the present invention an increase in physical properties in percent above the expected value can be greater than 0.2 times the difference of the MFI values. In an embodiment the increase in physical properties in percent above the expected value can range from between 0.2 and 5.0 times the difference of the MFI values, optionally from between 0.2 and 4.0 times the difference of the MFI values, optionally from between 0.2 and 3.0 times the difference of the MFI values, optionally from between 0.2 and 2.0 times the difference of the MFI values.

Example 3

A Brabender extruder was also employed to melt blend virgin HHC PS with EPS. The Brabender extrusion conditions are given in Table 8. It should be noted that substantial improvements in the quality of the final pellets were made using the Brabender extruder. However, some process issues were seen that were related to feeding mixtures of the HHC PS pellets and ground EPS. The EPS tended to separate from the pellets in the feed hopper leading to some irregular throughput. On the other hand there were no feed issues when using pellet blends employing pellets of Samples D & E. As shown, Irganox 1076® was not required in the Brabender to minimize polymer degradation. Moreover, the addition of 400 ppm of Irganox 1076® led to a notable increase in the brown tint of the pellets. Changing the screen pack from 200 to 60 mesh did lead to a slight increase in the yellowness of the pellets, a rise in the yellow and black speck contamination, and a drop in the initial back pressure (1,600 to 800 psi). Even with a 60 mesh size, the densified materials resulted in faster screen pack blinding, while the EPS in pellet form gave little change in the pressure with similar throughputs.

TABLE 8

| Brabender Extrusion Conditions. | |
|---|---|
| Zone Temperatures (° C.) | 200 |
| Screw Speed (rpm) | 100 |
| Screen Pack (mesh) | 60 |
| Optical Brightener (ppm) | 0, 30 |
| Nitrogen Purge | On |

Table 9 provides polymer data using the optimized conditions given in Table 8. As shown, the predicted and measured melt flows are similar for each sample. This suggests the Brabender extruder provided sufficient mixing without leading to vis breaking of the polymer. An optical brightener Ciba® UVITEX® OB-2,5-thiophenediylbis(5-tert-butyl-1,3-benzoxazole) (30 ppm) was used for blends containing Sample C and it is not surprising that lower hunter color numbers were seen when compared to the Sample F & G EPS blends made without this additive. The blended polymers of Sample D $ E pellets have relatively good color values even in the absence of any optical brightener. Finally, similar trends to those reported for the DSM and Haake experiments are seen in the tensile properties reported below. For the low melt flow WIC PS grades blended with high flow EPS products, there looks to be an increase in the tensile strength with blends containing up to 20-weight percent EPS. For the higher melt flow PS blended with high melt flow EPS, there is little change in the tensile strength.

TABLE 9

Polymer Properties of Brabender Extruded HHC PS/EPS Blends.

| Blend | Wt. % EPS | MFI (dg/min) | Predicted MFI (dg/min) | Tensile Modulus (psi) | Strength at Break (psi) | Tensile at Max (psi) | % Elongation at Break | Hunter Color L | b | YI |
|---|---|---|---|---|---|---|---|---|---|---|
| 535/Sample C | 0 | 4.5 | 4.5 | 448,696 | 7,219 | 7,265 | 1.84 | 80.31 | −0.02 | −0.5 |
|  | 20 | 5.7 | 5.4 | 447,881 | 7,524 | 7,524 | 1.93 | 80.3 | −1.36 | −2.51 |
|  | 40 | 6.2 | 6.4 | 442,584 | 6,980 | 7,025 | 1.77 | 80.34 | 1.14 | 2.56 |
| 523/Sample C | 0 | 12.6 | 12.6 | 449,625 | 5,896 | 5,966 | 1.38 | 81.99 | 1.01 | 1.13 |
|  | 20 | 12.1 | 11.9 | 443,790 | 5,958 | 5,991 | 1.40 | 81.82 | −0.8 | −1.51 |
|  | 40 | 11.8 | 11.6 | 441,735 | 5,281 | 5,318 | 1.23 | 80.61 | 1.1 | 2.06 |
| 535/Sample D | 0 | 4.6 | 4.6 | 448,696 | 6,019 | 6,082 | 1.42 | 80.31 | −0.02 | −0.5 |
|  | 20 | 4.6 | 4.6 | 449,840 | 5,971 | 5,957 | 1.42 | 81.47 | 0.62 | 0.49 |
|  | 40 | 4.5 | 4.5 | 446,367 | 6,339 | 6,386 | 1.55 | 81.45 | 1.47 | 2.1 |
|  | 100 | 4.4 | 4.4 | 450,701 | 6,714 | 6,730 | 1.67 | 81.47 | 3.86 | 6.5 |
| 523/Sample D | 0 | 11.5 | 11.5 | 449,625 | 5,294 | 5,366 | 1.16 | 81.99 | 1.01 | 1.13 |
|  | 20 | 9.1 | 9.5 | 451,256 | 5,184 | 5,285 | 1.27 | 81.54 | 0.83 | 0.79 |
|  | 40 | 7.6 | 7.8 | 451,473 | 6,180 | 6,202 | 1.48 | 81.4 | 1.38 | 2.19 |
|  | 100 | 4.4 | 4.4 | 450,701 | 6,714 | 6,730 | 1.67 | 81.47 | 3.86 | 6.5 |
| 535/Sample F | 0 | 4.6 | 4.6 | 448,696 | 6,019 | 6,082 | 1.42 | 80.31 | −0.02 | −0.5 |
|  | 20 | 5.3 | 5.1 | 451,338 | 6,529 | 6,547 | 1.59 | 78.78 | 2.14 | 4 |
|  | 40 | 5.8 | 5.6 | 449,540 | 6,439 | 6,480 | 1.59 | 76.99 | 4.85 | 10.13 |
|  | 100 | 7.4 | 7.4 | 443,484 | 6,415 | 6,474 | 1.80 | 69.17 | 11.25 | 27.61 |
| 523/Sample F | 0 | 11.5 | 11.5 | 449,625 | 5,294 | 5,366 | 1.16 | 81.99 | 1.01 | 1.13 |
|  | 20 | 10.4 | 10.5 | 442,076 | 5,332 | 5,387 | 1.26 | 79.56 | 2.58 | 4.89 |
|  | 40 | 9.5 | 9.6 | 442,061 | 5,419 | 5,430 | 1.30 | 77.4 | 4.49 | 9.17 |
|  | 100 | 7.4 | 7.4 | 443,484 | 6,415 | 6,474 | 1.80 | 69.17 | 11.25 | 27.61 |

Example 4

Figure 6:
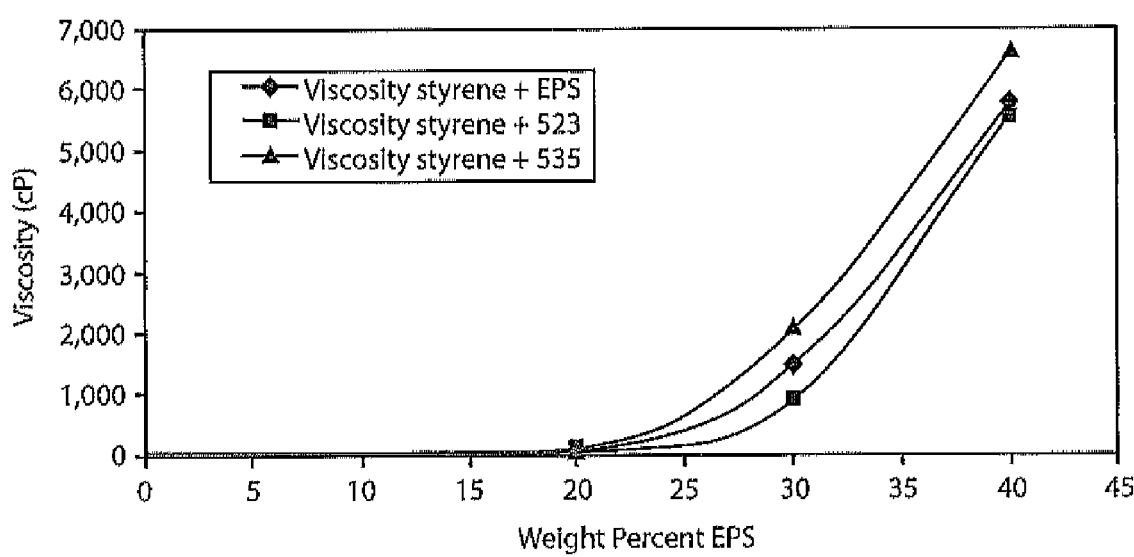
FIG. 6 is a graph of solution viscosity versus Sample C concentration in toluene at 22° C.

The incorporation of recycled EPS via reactor blending involved dissolving the EPS in styrene monomer and then completing batch polymerizations. Solution viscosities were measured using a Brookfield Viscometer to determine the maximum concentration of EPS that could be fed to the reactor (FIG. 6). For reference, solution viscosities of 535 and 523 are included. As shown, the viscosities remain essentially unchanged up to 20-weight percent PS. They rise rapidly after this and reach ca. 6,000 cP at 40-weight percent EPS. It should also be noted that introducing greater than 20-weight percent EPS proved difficult as the thicker solutions reduced the wetting of the flakes giving long dissolution times.

Figure 7:
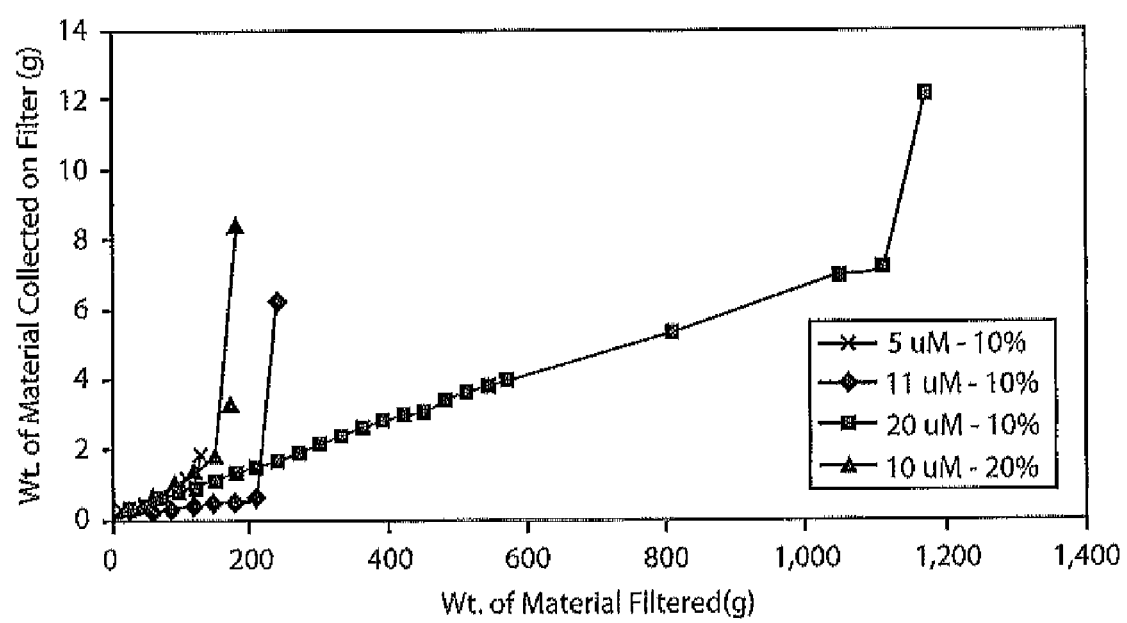
FIG. 7 is a graph of the weight of material collected on filter versus the total weight of solution filtered.

In order to remove contaminants from the EPS solution, filtrations using different size filters were completed. As shown in FIG. 7, the smaller micron filters plug at a quicker rate than the 20-micron filter as indicated by the sudden gain in mass on the filters. This suggests that most aromatic insoluble materials have particle sizes between 10 and 20 microns. This method can also be used to estimate the rate at which filters will plug or to estimate the size filters required to remove insoluble contaminants.

Figure 8:
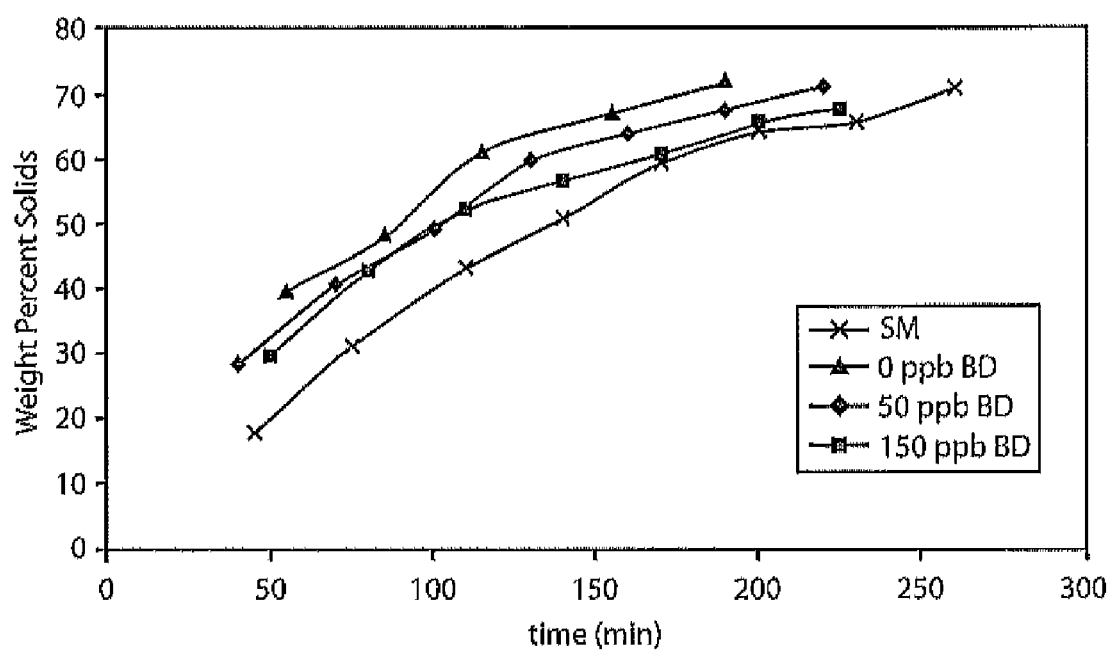
FIG. 8 is a graph of styrene conversion versus polymerization over time.

The polymerization experiments were conducted in a 0.5 liter reactor kettle equipped with a flat blade paddle under conditions as provided in Table 10. With a 20-weight percent EPS containing feed, the final EPS content at 70-percent solids was estimated to be 28.5 weight percent. As shown in FIG. 8, the slopes appear similar for each batch suggesting polymerization rates are unaffected by the EPS recycle. Interestingly, a similar trend to that seen for the melt blended materials was shown for the tensile properties of the batches, where the tensile strength and percent elongation increased with the addition of higher melt flow EPS (Table 11). Finally, the use of blue dye, Macrolex violet B from Lanxess AG, tended to mitigate any color problems, but at very high concentrations (Table 12).

TABLE 10

Batch Polymerization Conditions.

| | |
|---|---|
| Polymerization Temperature (° C.) | 130 |
| EPS Sample B Feed Concentration (Wt. %) | 0, 20 |
| Agitation Rate (rpm) | 150 |
| Ethylbenzene Concentration (Wt. %) | 10 |
| L-233 Concentration (ppm) | 177 |
| Blue Dye Feed Concentration (ppb) | 0, 50, 150 |
| Target Solids (Wt. %) | 70 |
| Devol Temperature (° C.) | 240 |
| Devol Pressure (torr) | <10 |
| Devol Time (minutes) | 45 |

TABLE 11

Polymer Properties for Batch Polymers.

| Wt. % EPS | Predicted MFI (dg/min) | MFI (dg/min) | Tensile Modulus (psi) | Strength at Break (psi) | Tensile at Max (psi) | % Elongation at Break |
|---|---|---|---|---|---|---|
| 0 | NA | 5.0 | 451,039 | 6,481 | 6,536 | 1.59 |
| 28.5 | 6.2 | 6.4 | 447,598 | 6,875 | 6,905 | 1.74 |

TABLE 12

Hunter Color Data for Batch Polymers.

| Wt. % EPS | Blue Dye Concentration (ppb) | L | a | b | YI |
|---|---|---|---|---|---|
| 0 | 0 | 79.83 | −1.8 | 2.19 | 3.29 |
| 28.5 | 0 | 78.39 | −1.16 | 4.11 | 8.31 |
| 28.5 | 50 | 78.21 | −0.99 | 3.45 | 6.98 |
| 28.5 | 150 | 76.18 | −1.55 | 2.21 | 5.05 |

Example 5

Table 13 shows the tensile properties of DSM melt blended samples of virgin GPPS (MFI=4.8 dg/min) and 523 W (MFI=10.4). Unexpectedly, the blends having melt flows of 5.6 and 6.5 show increases in tensile at break by as much as 20 percent of the predicted value from the equation shown in FIG. 1. Along those same lines, the percent elongation at break rises for the physical blends as well.

TABLE 13

DSM Compounder Blended GPPS and 523 W.

| Blend | Wt. % 523 W | MFI (dg/min) | Tensile Modulus (psi) | Tensile at Break (psi) | Tensile at Max (psi) | % Elongation at Break |
|---|---|---|---|---|---|---|
| GPPS | 0 | 4.8 | 462643 | 6942 | 7021 | 1.8 |
| GPPS/523 W | 20 | 5.6 | 480773 | 7448 | 7549 | 2.0 |
| GPPS/523 W | 20 | 5.6 | 445420 | 7052 | 7087 | 1.9 |
| GPPS/523 W | 40 | 7.9 | 450840 | 6471 | 6525 | 1.6 |
| GPPS/523 W | 40 | 6.5 | 449840 | 7860 | 7904 | 2.3 |
| 523 W | 100 | 10.4 | 459065 | 6252 | 6302 | 1.5 |

As used herein, the term "polystyrene composition" includes any polystyrene containing composition.

ASTM tests for measurements include: MFI—ASTM 1238 (200° C./5 kg); MW by GPC—ASTM 5296-05; YI—ASTM E313; Tensile Strength—ASTM D638; Flex Strength—ASTM D790.

Other possible embodiments include two or more of the above embodiments of the invention. In an embodiment the method includes all of the above embodiments and the various procedures can be carried out in any order.

It is to be understood that while illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Also, it is within the scope of this disclosure that the aspects and embodiments disclosed herein are usable and combinable with every other embodiment and/or aspect disclosed herein, and consequently, this disclosure is enabling for any and all combinations of the embodiments and/or aspects disclosed herein, Other and further embodiments, versions and examples of the invention may be devised without departing from the basic scope thereof and the scope thereof is determined by the claims that follow.

What is claimed is:

1. A polystyrene blend, comprising:
a first polystyrene containing composition having a first melt flow index; and
a second polystyrene containing composition having a second melt flow index;
wherein the second melt flow index is at least 2 dg/min higher that the first melt flow index;
wherein the second polystyrene containing composition comprises 0.1 to 40 wt. % of the total weight of the polystyrene blend;
wherein the first polystyrene containing composition has a first physical property value and the second polystyrene containing composition has a second physical property value and the polystyrene blend has an expected physical property value;
wherein the expected physical property value is a weighted average of the first physical property value and the second physical property value based on the amount of the first polystyrene containing composition and the second polystyrene containing composition in the polystyrene blend; and
wherein the polystyrene blend has an observed physical property value greater than 3% above the expected physical property value.

2. The polystyrene blend of claim 1, wherein the physical property is tensile strength.

3. The polystyrene blend of claim 1, wherein the physical property is % elongation at break.

4. The polystyrene blend of claim 1, wherein the second polystyrene containing composition is a recycled material.

5. The polystyrene blend of claim 4, wherein the recycled material comprises expanded polystyrene.

6. An article made from the polystyrene blend of claim 1.

* * * * *